(No Model.) 2 Sheets—Sheet 1.

A. C. EVANS.
FERTILIZING ATTACHMENT FOR CORN PLANTERS.

No. 280,367. Patented July 3, 1883.

Attest
G. M. Gridley
S. W. Ray

Inventor
Austin C. Evans
By B. C. Converse, Atty.

N. PETERS, Photo-Lithographer, Washington, D. C.

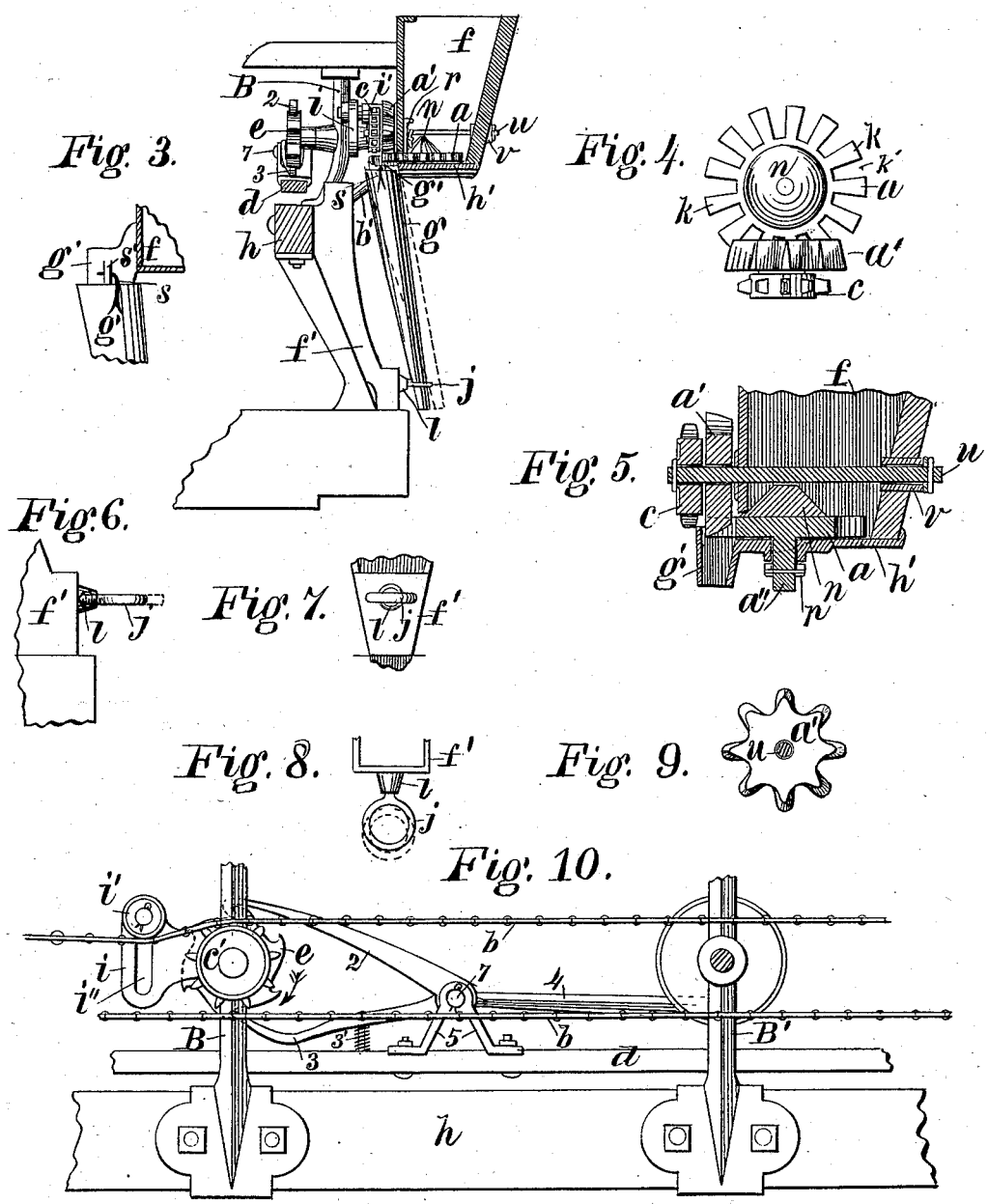

UNITED STATES PATENT OFFICE.

AUSTIN C. EVANS, OF SPRINGFIELD, OHIO.

FERTILIZING ATTACHMENT FOR CORN-PLANTERS.

SPECIFICATION forming part of Letters Patent No. 280,367, dated July 3, 1883.

Application filed December 21, 1882. (No model.)

*To all whom it may concern:*

Be it known that I, AUSTIN C. EVANS, a citizen of the United States, residing at Springfield, in the county of Clarke and State of Ohio, have invented certain new and useful Improvements in Fertilizing Attachments for Corn-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in fertilizing-machines.

My invention relates to that class of fertilizing-machines which are used in connection with a corn or seed planter; and it consists in a novel construction and arrangement of the feed-wheel and means for operating the same; also, in operating the fertilizing devices either automatically, by means of the driving mechanism for drilling and dropping the corn, or by the hand-lever. In either case the fertilizer is dropped at regular intervals, instead of continuously, as is usual in most fertilizing-machines. The machine is adapted for sowing all kinds of fertilizing compounds—such as bone-dust, plaster, lime, guano, &c.—in fact, any substance in a pulverulent state.

The object of my invention is the construction of a simple, easily-operated, and effective machine which will drop the fertilizing compound at even and regular distances in equal quantity at each discharge, which can be operated either by the hand-lever or by the automatic driving mechanism of a corn-planter, and which may be attached to any two-horse corn-planter, so as to be operated in combination therewith, also which can be easily detached therefrom without disturbing the other elements of the machine, also which has the discharging devices made adjustable, so as to enable the operator to drop the fertilizer exactly upon the seed before the latter is covered by the wheel of the planter, thus preventing any waste of the fertilizing compound by discharging it between the points where the seed may be deposited.

Two sheets of drawings accompany this specification.

Figure 1:
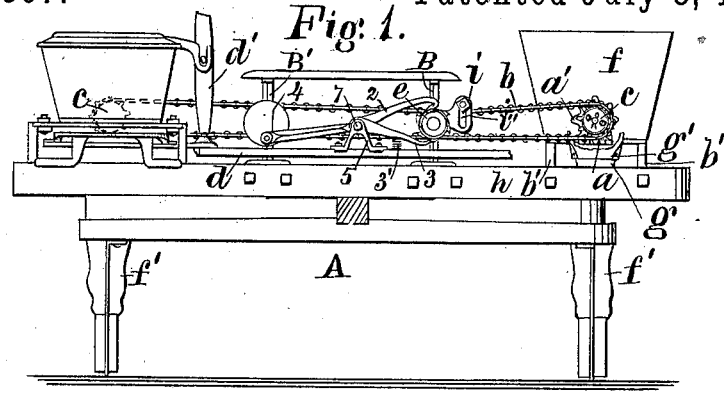
Figure 2:
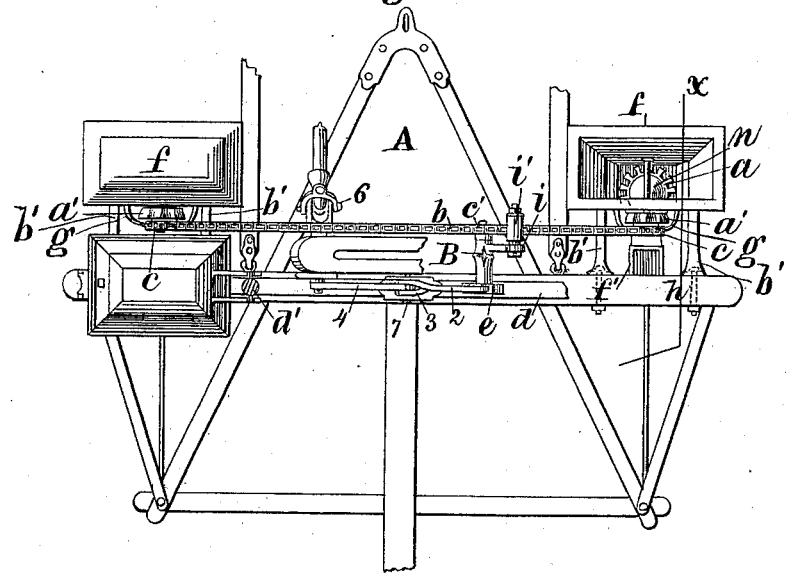

Figure 1 is a front view of the runner-section of a corn-planter to which my fertilizing devices are applied, the seed-box on the right being removed to bring to view the hopper of the fertilizer and its connecting mechanism. Fig. 2 is a top view of the same. Fig. 3 is a cross-section through line $x$, Fig. 2. Fig. 4 is a top view of the fertilizer-wheel and its driving-pinion, enlarged. Fig. 5 is a vertical section through the middle of the fertilizer-hopper and its inclosed devices from front to rear. Figs. 6, 7, and 8 are detail views of the adjustable ring-bracket which supports the discharge-spout of the fertilizer-hopper. Fig. 9 is a front view of the driving-pinion of the fertilizer-wheel. Fig. 10 is a rear view of the driving attachments to the slide-bar, enlarged. Fig. 11 is a view of the gate to the fertilizer-box.

The fertilizing compound is contained in a separate hopper or box in rear of the seed-hopper, which discharges its contents through a separate spout, which is supported behind the seed-spout by a ring-bracket, through which it extends. The latter is made adjustable by a screw extending therefrom into a boss on the lower end of the seed-spout. The fertilizer-tube is suspended by hooks, which pivot it at the upper end, so as to allow its lower end to be adjusted toward or from the seed-tube of the planter.

A is the front or runner section of a corn-planter; $h$, the main cross-bar of the same, which supports the seed-boxes $c$. In rear of these are placed the fertilizer-hoppers, which are supported by braces or brackets $b'$, bolted to the rear side of the bar $h$, and extending therefrom. The fertilizer-hoppers are made of the usual flaring rectangular form. The bottom of these are of iron, and the braces $b'$ are bolted thereto. In the bottom of the hopper, near the front side, is pivoted a horizontal rotary feed-wheel, $a$. This wheel, as will be seen by reference to the figures, is slotted from its periphery inward, forming square-ended teeth $k$, with nearly parallel sides. The slots or spaces $k'$ between the teeth are of the same form. The wheel is pivoted upon a vertical pivot or shaft, $a''$, and is cast in one piece with it. This is pivoted near enough to the front of the hopper to allow the teeth $k$ to project outside of the front wall over the dischargepipe $g'$, which leads into the tube $g$ and thence to the furrow. The wheel $a$ has a conical wooden top, $n$, which covers the central solid part of the same. It is secured to the wheel $a$ by wood-screws. The object of this cone is to cause the fertilizer-dust to fall down the sides of the cone to the openings between the teeth. It is made of wood to more readily clear itself, as it is well known that the phosphates and guano, or any substance used as a fertilizer containing ammonia, will adhere to iron plates, and for this reason the wooden conical cap $n$ is placed upon the top of the wheel.

Extending through the hopper $f$ from front to rear over the apex of the cone $n$ is a shaft, $u$. This is pivoted in the sides of the box, extending far enough beyond the front side to receive a sprocket-wheel, $c$, and the driving-pinion $a'$, which latter engages with the teeth of the fertilizer-wheel. The teeth of the pinion $a'$ are beveled from front to rear, so that they will enter the spaces $k'$ between the teeth of the fertilizer-wheel and push out the fertilizing compound that is carried out through the opening made in the front side of the hopper for that purpose. Upon the extreme outer end of the shaft $u$ in each hopper, outside of the driving-pinion, is the small sprocket-wheel $c$. These are connected by the endless drive-chain $b$, which is operated by either the hand-lever $d'$, as seen in Fig. 1, or by the shaft 6, which may be connected to any suitable driving mechanism upon the rear or wheel section of the planter.

By reference to Figs. 1, 2, and 10 it will be noticed that one of the elements of the driving mechanism is seen attached upon the slide-bar $d$ midway between the two posts B and B', which support the seat-bar for the dropper's seat. It consists of a pair of long pawls, 2 and 3, with the rear ends of both pivoted upon the same bolt 7 with the end of the pitman 4, which connects the slide-bar with the crank-wheel. These two pawls engage with the teeth of the ratchet-wheel $e$. (Seen in Figs. 1, 2, and 10.) This wheel is cast in one piece with or attached to the front end of a short shaft pivoted in a sleeve or box formed in one piece with the seat-post B, and is in the same horizontal plane with that which supports the driving-shaft and crank-wheel on the post B'.

A sprocket-wheel, $c'$, is fastened to the rear end of the shaft of the ratchet-wheel $e$, and on the opposite side of post B to that of said wheel $e$. It is also placed between the sprocket-wheel $c$ upon the opposite sides of the machine, and is provided with an endless drive-chain, which passes over said wheels $c$.

In operating the fertilizer attachment, motion is imparted to the slide-lever $d$, and as it is reciprocated the pawls 2 and 3 drive the ratchet-wheel $e$ in the direction of the arrow, Fig. 10, turning the sprocket-wheel $c'$ on the opposite end of its shaft, in the same direction and driving chain $b$, in the view Figs. 1 and 2, from right to left, and in the reverse view, Fig. 10, from left to right. As the power is applied first to the slide-bar or lever $d$ before it can reach the fertilizing devices from the driving mechanism connected with a slide-lever by the shaft 6, as well as by the hand-lever $d'$, it will be seen that the mode of thus applying it is novel, and that the fertilizing-wheels, instead of being driven continuously, will have a regular interrupted rotary movement, the same as the seeding devices that receive their motion from the slide-bar, and that the fertilizing compound will be dropped regularly in the corn-hills and not strung along in an unbroken line, as with most fertilizing machines. As the wheel $a$ is rotated, its teeth and the intervening slots or openings $k'$ between them pass consecutively outside of the front of the hopper $f$, carrying the dust in the slot, till they pass under the pinion $a$, the teeth of which, engaging with the slots or spaces, push out the fertilizer, which is dropped upon the corn by the same movement which discharges the latter, and with equal regularity.

By reference to the view Fig. 3 it will be noticed that the tube $g$ of the fertilizer is provided with wire hooks $s$ upon either side, that engage with holes in lugs $s'$ on each side of the discharge-spout $g'$, being thus pivoted at the top end, so as to allow the lower end to be thrown back to any desired distance in rear of the seed-tube, the adjustability being made by the ring-bracket $j$, which screws into the conical boss $l$ near the foot of the seed-tube $f'$. The dotted lines in Figs. 3 and 8 indicate the degree of adjustability. In Fig. 6 a piece of the conical boss $l$ is shown broken out to exhibit the screw on the shank of the ring-bracket $j$. In the detail of Fig. 3 and in the view Fig. 5 it will be noticed that the discharge-spout $g'$ of the fertilizer-hopper $f$ is outside and in front of it, and that the pinion $a'$, which forces the fertilizer from the wheel $a$ into it, is in full view of the dropper.

The bottom plate, $h'$, and the discharge-spout $g'$ of the fertilizer-hopper are cast in one piece. The part of the bottom plate surrounding the shaft of the fertilizer-wheel is re-enforced from the outside to strengthen it. The vertical shaft $a''$ of the feed-wheel $a$ is held by a pin, $p$, and an interposed washer under the collar or re-enforce part of the hopper-bottom.

I claim as my invention—

1. In a fertilizing attachment for a corn-planter having a horizontally-rotating dropping-disk with radial teeth and open spaces between them for collecting the fertilizer substance from within the hopper and carrying it outside of the same, the combination therewith of a toothed pinion, the teeth of which engage the teeth of the disk at right angles to the plane of the latter, and a slide-lever for actuating said pinion intermittently, whereby the fertilizer substance is dropped at intervals at the same time with the corn.

2. In a fertilizer-machine, the combination, with the hopper for containing the fertilizer substance and the horizontal rotating toothed disk pivoted therein, and having its teeth rotating outside of the same, of a horizontal shaft extending through and pivoted in opposite sides of said hopper, and a driving pinion upon the outer end thereof adapted to engage with the teeth of the fertilizer-disk to rotate it and to push out the fertilizing substance in the spaces between them.

3. In a fertilizing attachment for a corn-planter adapted to drop the fertilizer substance at intervals in the same hills with the corn, the combination, with the hopper having the discharge-spout on the outside of the same, of the horizontally-rotating dropping-disk pivoted therein, and adapted to collect and carry the fertilizer substance outside of the same, the pinion engaging with said disk to drive it and to push out the fertilizer substance from between its teeth at the proper distances, and the slide-lever with its connecting devices, the whole arranged and operated to drop the fertilizer substance and the corn together at the same time and at regular intervals.

4. In a corn-planter having a fertilizer attachment the disk of which operates horizontally in a separate hopper from that containing the corn, the combination, with the slide-bar and the seeding devices, of a separate pair of pawls for driving the fertilizer-disk operated by the same movement of said lever which actuates the seeding devices.

5. A fertilizing attachment for a corn-planter, having a dropping-disk for dropping the fertilizer in a separate hopper from that of the seeding devices, pivoted in a horizontal plane parallel with that of the seed-disk, and having an intermittent movement imparted to it by the slide-lever at the same time with the seed-disk, whereby the fertilizer substance is dropped at stated intervals simultaneously with the corn.

6. A fertilizer attachment for a corn-planter, having a dropping-disk for dropping the fertilizer substance, rotating horizontally in a separate hopper from that containing the corn, and driven by a separate pair of pawls from those used for driving the seed-disk, the pawls of both the fertilizer-disk and the seed-disk being connected with the same slide-lever, whereby the same interrupted rotary movement is given to both the fertilizer-disk and the seed-disk, and the fertilizer substance and the corn are each dropped simultaneously and in the same hill.

7. In a corn-planter having a fertilizer attachment the dropping-disk of which is operated in a separate hopper from that containing the corn, the combination, with the two dropping-disks, of two pairs of pawls, one pair arranged to drive the seed-disk and the other to actuate the fertilizer-disk, both pairs of pawls being operated by a single slide-lever, which rotates the two disks intermittently at the same time, and thereby adapts the machine to drop both the corn and the fertilizer substance in the same place and at the same time.

8. In a two-horse corn-planter having a fertilizer attachment, the combination, with a single slide-lever, of a horizontally-rotating dropping-disk for dropping the fertilizer substance, and a horizontally-rotating seed-disk for dropping the corn, each dropping device being located in a separate hopper, and connected with said slide-lever by a separate pair of pawls, and both adapted to be operated by the same movement of said slide-lever to drop the fertilizer substance and the corn at the same time and in the same place in both hilling and drilling.

9. The combination, with the seat-post of a planter having a fertilizing attachment, of a bracket for supporting a pulley or idler operating upon the drive-chain of said fertilizing attachment, and provided with means for adjusting said pulley thereon, as set forth.

10. In a corn-planter having a fertilizing attachment driven intermittently by the slide-lever of the same, the combination, with the seat-post, (of the dropper's seat,) having a sleeve-support cast thereon, of the ratchet and drive-chain wheels upon the same shaft, pivoted in said seat-post, and adapted to be operated in transmitting an intermittent movement from the slide-lever to both the seeding and fertilizing devices.

11. In a fertilizer attachment for a two-horse corn-planter, arranged to drop the fertilizer substance in the same hills with the corn, the combination, with the dropping devices and the slide-lever actuating the same, of the vertically-rotating ratchet-wheel and the pawls engaging therewith located between the hoppers and adapted to operate said dropping devices, as set forth.

12. In a two-horse corn-planter having intermittent rotary seeding devices actuated by a slide-bar and pawls, the combination of a fertilizing attachment having intermittent rotary dropping devices actuated through a drive-chain ratchet-wheel and pawls, the latter being pivoted to the same slide-lever between the hoppers and operated by the same movement therewith.

In testimony whereof I affix my signature in presence of two witnesses.

AUSTIN C. EVANS.

Witnesses:
 B. C. CONVERSE,
 G. M. GRIDLEY.